June 24, 1952 H. W. LINK 2,601,405
ELECTROHYDRAULIC SHIP STEERING GEAR
Filed Sept. 27, 1950 4 Sheets-Sheet 1

FIG. I.

INVENTOR.
HARRY W. LINK
BY
ATTORNEYS.

June 24, 1952  H. W. LINK  2,601,405
ELECTROHYDRAULIC SHIP STEERING GEAR
Filed Sept. 27, 1950  4 Sheets-Sheet 2

INVENTOR.
HARRY W. LINK
BY
ATTORNEYS.

June 24, 1952 H. W. LINK 2,601,405
ELECTROHYDRAULIC SHIP STEERING GEAR
Filed Sept. 27, 1950 4 Sheets-Sheet 4

INVENTOR.
HARRY W. LINK
BY
ATTORNEYS.

Patented June 24, 1952

2,601,405

UNITED STATES PATENT OFFICE 2,601,405

ELECTROHYDRAULIC SHIP STEERING GEAR

Harry W. Link, Merion, Pa., assignor to C. H. Wheeler Manufacturing Company, Philadelphia, Pa., a corporation of Pennsylvania Application September 27, 1950, Serial No. 186,970

16 Claims. (Cl. 60—52)

This invention relates to electro-hydraulic gear for ship steering, and more particularly, to steering apparatus adapted for use on small boats, such as, tug boats, fire boats, and the like.

It is an object of the present invention to provide a power operated steering gear which is responsive to the setting of a hand operated steering wheel in which the setting of the hand wheel is translated into a predetermined degree of rudder displacement.

It is a further object of this invention to provide such an apparatus in the form of substantially prefabricated units comprising steering wheel and column assembly, a control box assembly and a ram group assembly for actuating the ship's rudder stock, and to provide these units in such a form as to be easily installed in a ship.

It is another object of this invention to provide a power operated steering gear which may be manually operated from the steering wheel upon ship's power failure.

It is another object of this invention to provide a steering gear which will automatically and instantaneously change over from automatic operation to manual operation upon power failure.

It is still another object of this invention to provide a steering gear which will automatically return from manual operation to power operation upon recovery of ship's power only when the steering wheel and the rudder are in matching position.

These and other objects of the invention will become apparent from the following description when read in conjunction with the accompanying drawings, in which.

Figure 1:
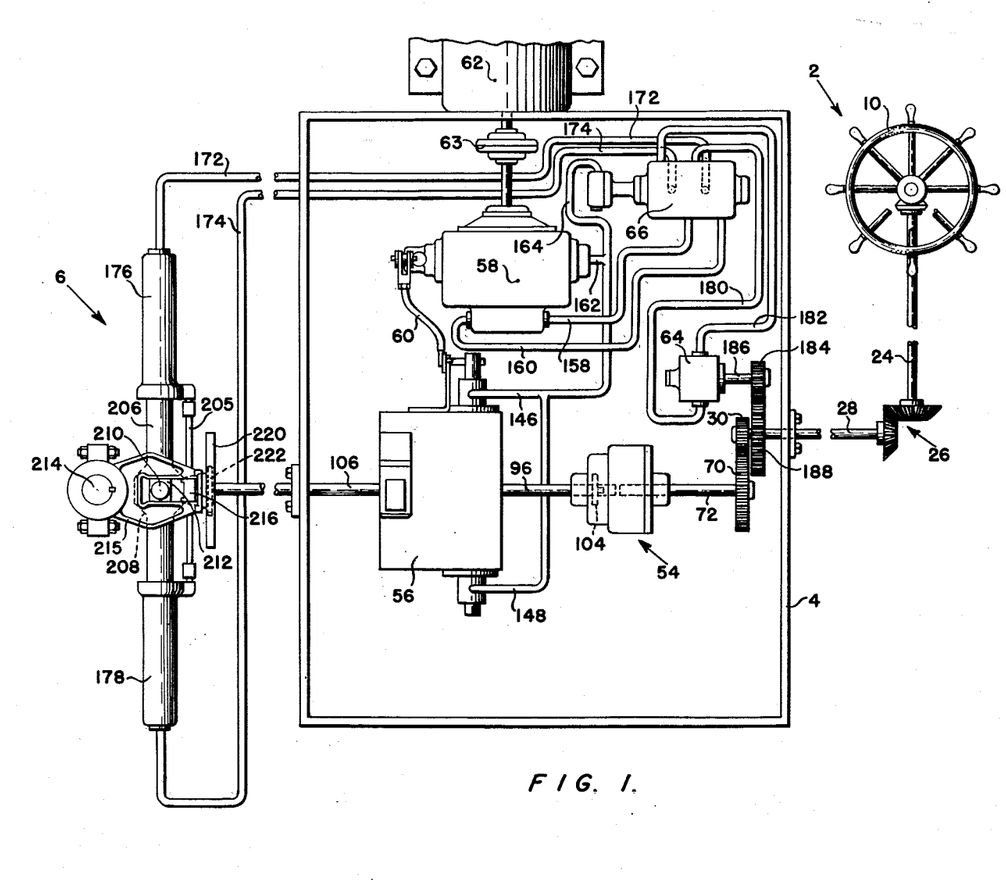
Figure 1 is a diagrammatic lay-out of the present electro-hydraulic ship's steering gear showing the steering wheel assembly, the control box assembly and the ram group assembly.

There is shown in the right hand portion of Figure 1, in schematic form, the steering wheel and the shafting, as indicated generally by the numeral 2, for transferring motion from the steering wheel to the control box assembly which is shown within the frame 4. On the left hand side of Figure 1, as indicated generally by the numeral 6, is the ram group assembly which serves as a hydraulic motor to actuate the ship's rudder stock in response to the flow of hydraulic fluid delivered thereto from the apparatus included in the control box assembly.

Figures 8, 9, 10:
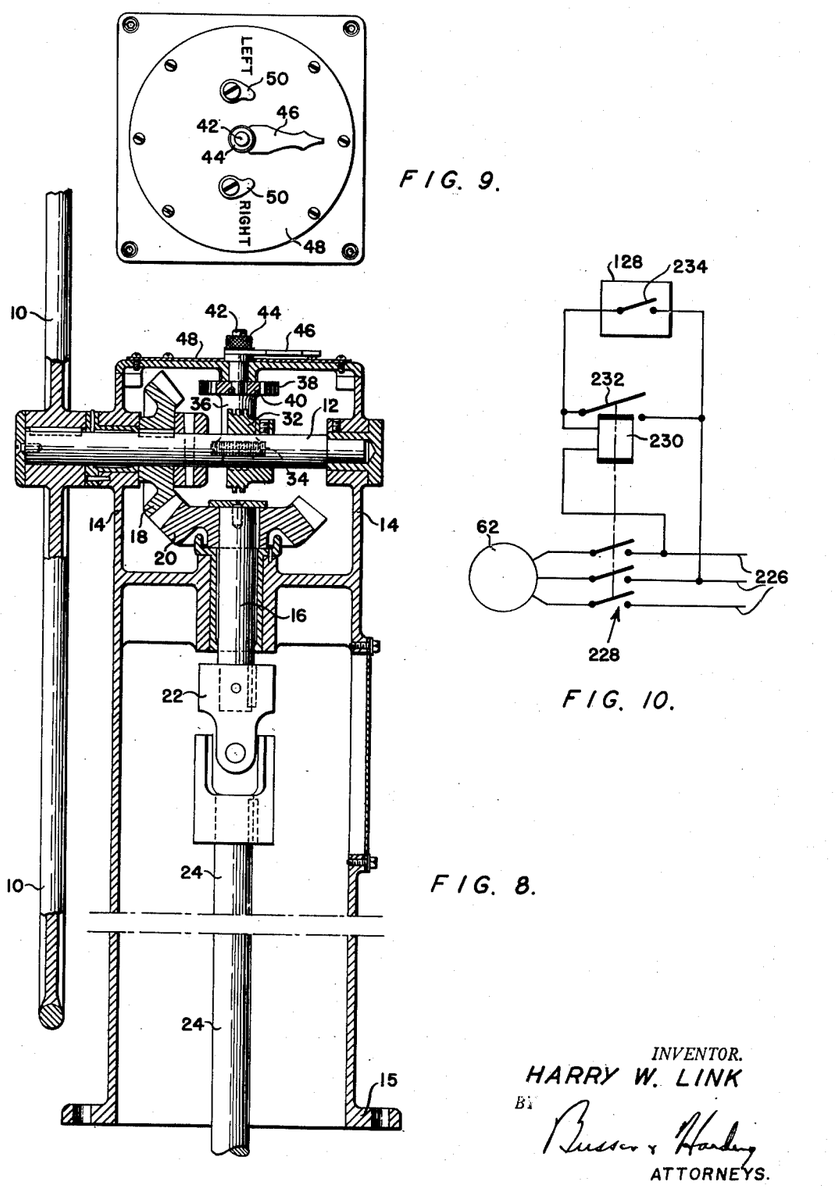
Figure 8 is a cross-sectional view of the steering column.
Figure 9 is a top view of the steering column showing the steering wheel position indicator.
Figure 10 is an electrical diagram of the motor starter circuit.

Referring to the various figures, there is shown the ship's steering wheel 10 which is supported by the shaft 12 which is rotatably mounted in the steering column 14. The steering column is provided with the base portion 15 and may be conveniently mounted in conventional location on the ship. Also rotatably mounted in the steering column 14 is the vertical shaft 16. Motion of the hand wheel 10 is conveyed to the shaft 16 by means of the shaft 12, the bevelled gear 18 which is keyed to the shaft 12 and the bevelled gear 20 which is in mesh with the gear 18 and keyed to the shaft 16. The shaft 16 is coupled through the universal joint 22, shaft 24, the bevelled gear assembly shown generally at 26 and additional suitably mounted shafting 28 to the spur gear 30 within the control box 4.

Also mounted on the shaft 12 is the worm gear 32 which is in mesh with a mating gear 34 which is cut in the lower portion of the member 36, the upper portion of the member 36 being in the form of the spur gear 38 which is in mesh with the sectionally shown spur gear 40 which is rigidly mounted on the lower end of the shaft 42. Frictionally mounted to the upper end of the shaft 42 by means of the friction nut 44 is the pointer 46.

Mounted on the top surface of the steering column 14 is the plate 48 which carries the pointer stop members 50 and which may be marked with suitable graduations to indicate the steering wheel position.

Referring to Figure 1 there is shown the control box 4. Within this box are mounted the clutch assembly 54, a differential control assembly mounted within the housing 56, a variable and reversible stroke pump 58 which is controlled through linkage 60 by the differential control assembly and is powered by the motor 62 through the coupling 63, the fixed displacement hand steering pump 64, the hydraulic transfer valve 66, and shafting and hydraulic piping. This apparatus will be hereinafter described in detail.

The control box, the side wall of which is indicated by the numeral 4, is an oil tight box having a mounting shelf intermediate of its depth on which the various above mentioned elements are mounted. The space within the box below the shelf serves as an oil reservoir and as a sump to collect oil leakage from any of the various hydraulic apparatus contained in the box. This control box may be provided with a lid which is bolted down through a gasket, and thus there is provided a completely enclosed assembly which may be prefabricated and mounted on a ship, with assurance that the various apparatus contained therein is completely free from dust, moisture, and the like.

Figure 3:
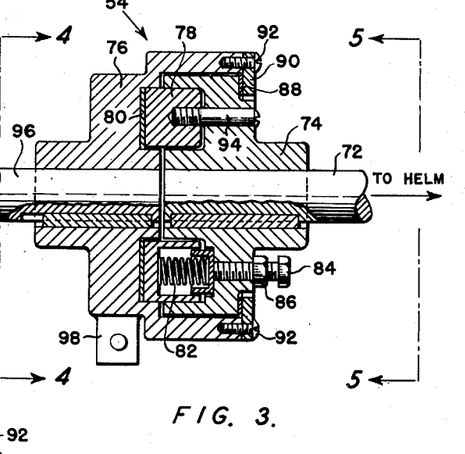
Figure 3 is a sectional view of the clutch member, shown within the control box assembly of Figure 1, taken on the plane indicated by the trace 3—3 shown in Figure 4.
Figure 4:
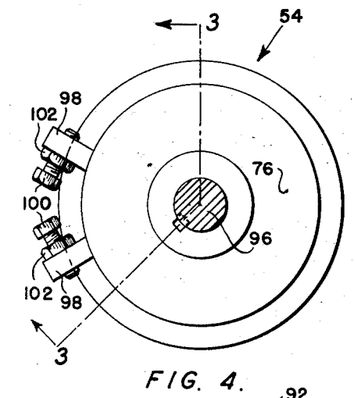
Figure 4 is an end view of the clutch member as indicated by 4—4 in Figure 3.
Figure 5:
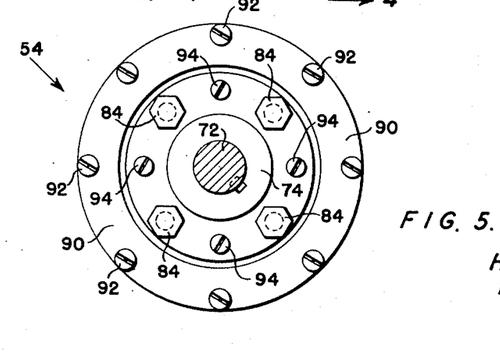
Figure 5 is an end view of the clutch member as indicated by 5—5 in Figure 3.

The gear 30 which is keyed to the end of the shaft 28 extending within the control box 4 meshes with the gear 70 which is keyed to one end of the shaft 72. Mounted on the other end of the shaft 72 is the clutch member 54. The clutch includes the member 74 which is keyed to the shaft 72 and is retained in the housing 76. The member 74 carries the pressure disc 78 which is urged against the pressure plate 80 by the force exerted by springs 82. The spring tension may be adjusted by means of the set screws 84 which are threaded into the member 74 and may be locked into position by the lock nuts 86. The spring force reaction is taken up against the friction ring 88 which is mounted under the ring 90, the ring 90 being mounted on the housing member 76 by means of the screws 92. The pins 94 are threaded into the pressure disc 78 and slideably mounted in bores in the member 74 thereby permitting the pressure disc to move laterally with respect to the member 74 but serving to prevent rotation of the disc 78 with respect to the member 74.

The housing 76 is keyed to the shaft 96 and is provided with the pair of extending lugs 98, each of which mounts a set screw 100 which is locked into position by a lock nut 102. A stop member 104 is provided to be engaged by the ends of the set screws 100 in order to limit the rotation of the housing 76 of the clutch member to approximately 300°. The stop member 104 is mounted in the control box, as shown in Figure 1, below the clutch 54. The clutch member and the fixed stop act to limit the rotation of the clutch housing 76 and the shaft 96 to a predetermined degree. Additional rotation of the steering gear after clutch housing has rotated to the limit as determined by the setting of either of the set screws 100 will merely cause the clutch to slip and will not cause additional rotation of the shaft 96. It is noted that the setting of the set screws 100 and the setting of the steering position indicator stops 50 is adjusted so that the steering wheel position indicator pointer will contact one of the stops 50 as the corresponding clutch set screw engages the clutch stop 104.

Figure 6:
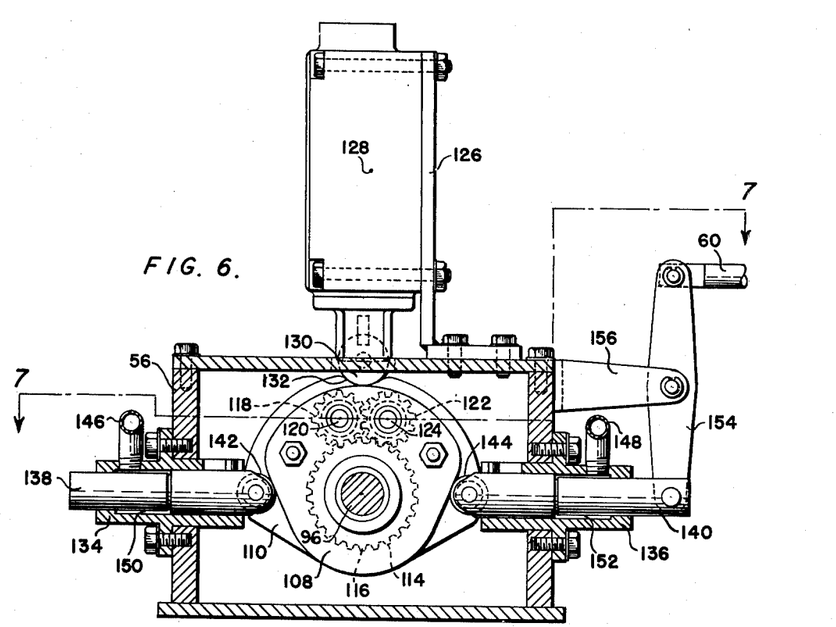
Figure 6 is an elevation, partly in section, of the differential control assembly shown within the control box of Figure 1, as viewed from the steering wheel input side.
Figure 7:
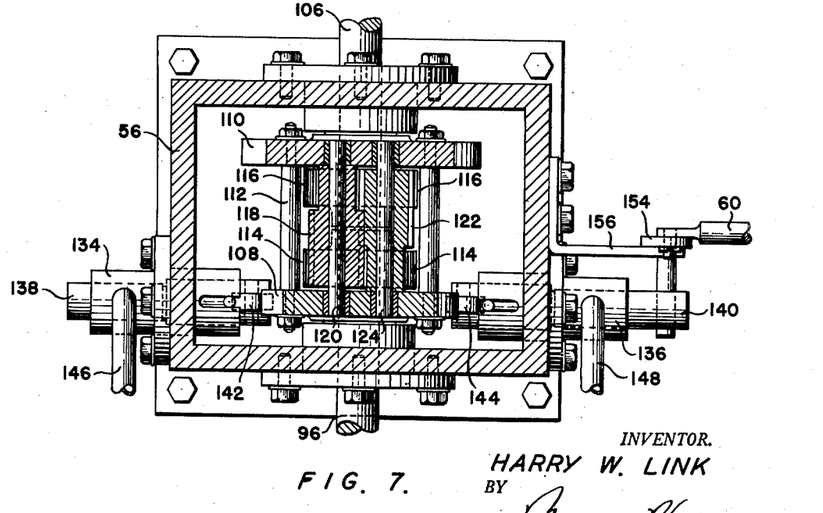
Figure 7 is a plan view of the differential control assembly taken on the trace 7—7 shown in Figure 6.

Mounted within the housing 56 is the differential control and cam follower mechanism. Entering the housing 56 is the shaft 96 which is rotated to a limited degree by the rotation of the steering wheel as hereinbefore described. Also entering the housing 56 is the shaft 106 which, as will be hereinafter described, is rotated by motion of the ram group operating the rudder. Rotatably mounted on the shaft 96 is the cam 108 and rotatably mounted on the shaft 106 is the cam 110. The cams 108 and 110 are bolted in rigid relation with respect to each other by means of the tie bolts 112. Rigidly mounted to the end of the shaft 96 is the spur gear 114 and rigidly mounted to the end of the shaft 106 is the spur gear 116. The spur gear 118 is mounted on the shaft 120 which is rotatably mounted in the cams 108 and 110. The spur gear 122 is mounted on the shaft 124 which is also rotatably mounted in the cams 108 and 110. The gear 118 is meshed with the gear 114, the gear 122 is meshed with the gear 116 and the gears 118 and 122 are meshed with each other.

Mounted on the top of the housing 56 is the bracket 126 which supports the casing 128 which contains a conventional limit switch which is actuated by motion of the cam follower 130 which rides on the surface of the cam 110. The switch is so arranged that the contact is closed only when the cam is in the position shown in Figure 6 with the cam follower seated in the recess 132 on the surface of the cam 110. Mounted in the walls of the housing 56 are the retaining members 134 and 136. Contained within these members are the piston and guide rod members 138 and 140, respectively. Each of these members mounts a cam follower, 142 and 144 respectively, which is urged into engagement with the cam 108 by means of the pressure of oil which is admitted through the pipe lines 146 and 148 into the chambers 150 and 152, respectively.

Upon rotation of the cam 108, each of the cam followers moves inwardly or outwardly depending upon the rotation of the direction of the cam and the oil displaced by one enters the other. Motion of the cam follower 144 results in motion of the link 154 which is pivotally mounted on the bracket 156 which is attached to the housing 56. Motion of the link 154 results in motion of the link 60 which is connected to and controls the stroke and the direction of the output of the pump 58.

Pump 58 is a conventional variable and reversible radial piston type pump which is operated on a closed system and includes a supercharger pump for supplying makeup fluid to the pump, and also includes the various relief valves and check valves required for the hydraulic system. The pump is connected to a pair of main hydraulic pipe lines 158 and 160 which are connected to the hydraulic transfer valve 66. The pump 58 is also provided with an outlet connected to the relatively low pressure pump supercharger. To this outlet is connected the pipe line 162 which is connected to the lines 146 and 148 supplying pressure to the differential cam followers. Also connected to the line 162 is the line 164 supplying pressure to a holding piston in the hydraulic transfer valve.

The hydraulic transfer valve is a conventional sliding piston type six-way valve having two positions and having pipe lines 172 and 174 connected to its outlet ports. These pipe lines are connected to the cylinders 176 and 178, respectively, of the ram group, as will be hereinafter described.

Also connected with the hydraulic transfer valve are the lines 180 and 182 leading from the pump 64 which is a fixed displacement pump arranged to be in constant operation from the steering wheel by means of the gear 184 which is mounted on the pump shaft 186 and which is in engagement with the gear 188 which is mounted on the shaft 28.

Figure 2:
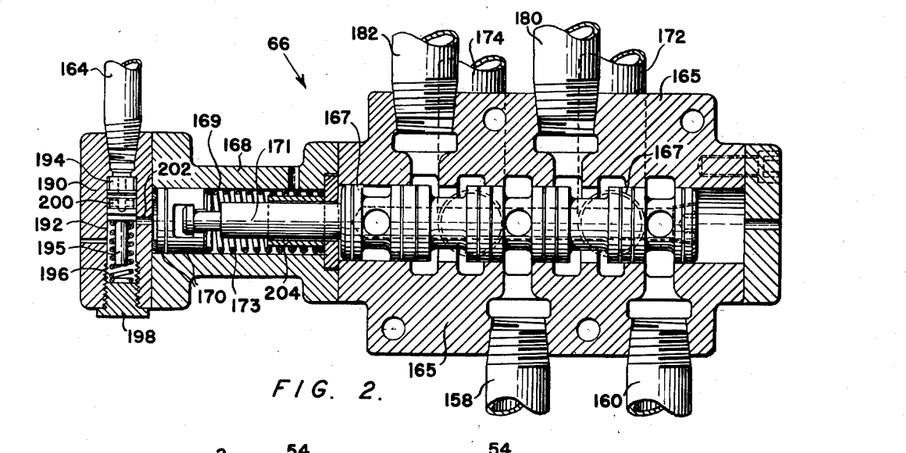
Figure 2 is an enlarged showing, partly in section, of the hydraulic transfer valve shown in the control box assembly of Figure 1.

The hydraulic transfer valve 66 includes the valve housing 165 within which is mounted the sliding valve piston 167 which controls the flow of oil between the various ports of the valve. Mounted on the left hand end of the valve body, as viewed in Figure 2, is the valve piston control mechanism which includes the member 168 containing a central bore 169 within which is mounted the piston 170 which is mounted on the member 171 which is an extension of the valve piston 167. Also mounted within the bore is the spring 173 which urges the piston 170 to the left hand end of the bore. Mounted on the left end of the member 168 is the member 190 which contains the bore 192 within which is mounted the piston 194. Oil under pressure is admitted through the pipe line 164 and acts against the piston 194, moving the piston downwardly against the urging of the spring 196 until the lower end of the piston stem 195 engages the base of the plug 198 at which time the bored passage 200 within the piston 194 is in alignment with the passage 202, and oil is admitted against the head of the piston 170, the pressure of the oil being sufficient to counteract the force of the spring 173, thereby moving the piston 170 to the right, as viewed in Figure 2, causing the valve piston 167 to also move to the right for a distance limited by the engagement of the piston 170 with the stop sleeve 204.

When the valve is in the position as shown, with no pressure existing in the line 164, the lines 180 and 182 from the hand operated pump 64 are connected to the lines 172 and 174. When pressure exists in the line 162 and the valve piston is moved to the right, the pipe lines 158 and 160 from the motor driven pump 58 are connected to the pipe lines 172 and 174, respectively, and the lines 180 and 182 from the hand driven pump are short circuited on themselves through the valve.

Referring to the ram group, shown generally by the numeral 6 in Figure 1, the cylinders 176 and 178 contain and mount the steering gear ram 206. This ram is forced back and forth between the cylinders by a differential in the hydraulic pressures as created in the cylinders by the operation of the pump 58. Rotatably mounted within the enlarged central portion 208 of the ram 206 is the pin 210 which carries on its upper and lower ends the square bushing blocks 212. Rigidly mounted on the rudder stock 214 are the upper and lower crossheads 215 which respectively engage the upper and lower bushing blocks 212. Also mounted on the enlarged portion 208 of the ram is the block 216 which slides on the guide rod 205 as the ram moves back and forth and which mounts the rack gear 220. In engagement with the rack gear 220 is the pinion gear 222 which is mounted on the end of the shaft 106.

The operation of the steering mechanism may now be described. With the motor 62 energized, the pump 58 rotating, the steering wheel in a zero position with the steering wheel indicator in a zero position, as shown in Figure 9, and the rudder in a zero or straight forward position, the cams in the differential control assembly will be in the position shown in Figure 6. With the various elements of the apparatus in these positions the pump control lever 60 will be in a neutral position, and the pump 58 will not discharge fluid under pressure to either of the pipe lines 158 or 160. Supercharger pressure will, however, be existent in the pipe line 162. Thus pressure will exist on the cam follower piston members 138 and 140, thus holding the cam followers in engagement with the cam 108, and imposing on the cam a balanced load position. Supercharge pressure will also be holding the hydraulic transfer valve piston in the right hand position as viewed in Figure 2, at which time the pipe lines 158 and 160 are connected to the pipe lines 174 and 172, respectively.

If the helmsman rotates the steering wheel to the left, the shafting 24, 28, 72 and 96 will be rotated through the various gear connections and through the clutch 54 as previously described, and the gear 114 in the differential control assembly will be rotated clockwise as viewed in Figure 6. Rotation of this gear in clockwise direction will cause rotation of the gear 118 in counterclockwise direction and the gear 122 in clockwise direction which will, in turn, cause clockwise rotation of the cam members 108 and 110 mounting these gears. This rotation of the cams must occur because the shaft 106 which mounts the gear 116 does not rotate unless the rudder is changing position. The resulting clockwise rotation of the cam 108 forces the cam follower 140 to move outwardly, displacing the lever 154 and the arm 60. This motion of the arm 60 moves the pump control arm in such a direction as to cause the pump to direct fluid under pressure into line 160 which is connected through the valve 66 and the line 172 to the ram cylinder 176. This pressure in the ram cylinder 176 causes the ram 206 to move toward the cylinder 178 and to carry with it the crossheads 214 causing the rudder stock to rotate and thereby move the rudder to a left rudder position.

As fluid under pressure enters cylinder 176, fluid must simultaneously leave the cylinder 178 and pass back through the pipe line 174, valve 66 and pipe line 158 to reach the pump 58.

When the ram 206 is moved downwardly, as viewed in Figure 1, the rack gear 220 also moves downwardly and rotates the spur gear 222, causing the shaft 106 to rotate. This rotation of the shaft 106 rotates the gear 116 in a counterclockwise direction as viewed in Figure 6, causing the gear 122 to rotate clockwise and the gear 118 to rotate counterclockwise, and causing the cams 110 and 108 to rotate counterclockwise because the shaft 96 is at this time stationary.

It will be apparent that as the rudder moves to a position corresponding to the amount of motion of the steering wheel, or stated otherwise, as the gear 116 moves a distance equal to but in an opposite direction from the motion of the gear 114, the cams 108 and 110 will return to their zero position as shown in Figure 6. With the cams in this position the cam follower 140 which is held in engagement with the cam 108 by oil pressure in chamber 152 will be returned to its neutral position and will actuate the lever 154 and the control rod 60 to restore the pump control to its neutral position, whereupon the pump will be restored to its neutral or idle position and no further differential in pressure will be applied across the ram. In similar fashion, any displacement of the hand steering wheel 10 within the limits of the stroke of the cam 108, as is indicated by the positions of the stops on the steering wheel indicator and controlled by the setting of the set screws 100 of the clutch assembly, will give rise to a corresponding displacement of the rudder.

In the event of ship's power failure, operation of the motor 62 and the pump 58 will terminate and supercharger pump pressure in the line 64 will drop to zero, whereupon the spring 173 of the hydraulic transfer valve will carry the valve piston assembly to the left hand position in Figure 2 in which position the pipe lines 158 and 160 from the pump 58 are short circuited on themselves, and the pipe lines 180 and 182 from the hand steering pump 64 will be connected to the pipe lines 172 and 174 and to the ram cylinders 176 and 178, respectively.

When the steering gear is operating under power control, approximately four turns of the hand wheel will produce full rudder displacement, whereas, when steering under hand power, approximately ten to thirty turns of the hand wheel are required to produce maximum rudder displacement. While these figures are approximate and vary for the particular steering system involved, they will serve by way of example to make it apparent that when steering under hand power, after four turns of the steering wheel, the pointer 46 of the hand wheel indicator which is mounted on a steering column will engage one of the stops, and simultaneously, the corresponding clutch set screw 100 will engage the clutch stop member 104. The remaining number of turns of the hand wheel which are required to accomplish the desired rudder displacement must then be made with the clutch 54 and with the pointer 46 slipping on their respective shafts. Continued operation under conditions or no power require merely that the helmsman rotate the steering wheel in either direction sufficiently so as to pump manually the necessary amount of oil to move the ram 206 in either direction to the necessary degree to accomplish the necessary rudder displacement. It should be noted, however, that under these conditions the shaft 96 and the cams 108 and 110 never rotate in excess of their normal operating rotation.

While the steering is being accomplished under hand power during a period of ship's power failure, the return of ship's power will not cause an immediate return of automatic powered steering. In Figure 10 there is shown the wiring diagram of the electrical circuit controlling the motor 62. There are shown in Figure 10 the main power lines 226 which are connected to the motor 62 through the contacts 228 of a conventional motor starter. The coil 230 of the motor starter receives power from two of the power lines 226 only when at least one of the contacts 232 or 234 are closed. Contact 232 is an auxiliary contact on the motor starter which serves to seal in the motor starter coil after the coil has been energized. Contact 234 is the interlock contact provided by the limit switch which is mounted within the housing 128 and which is in closed position only when the cam 110 is in the position shown in Figure 6 with the limit switch cam follower 130 seated in the depression 132 in the surface of the cam 110. Thus it will be apparent that the motor 62 cannot be started unless the differential control cams 108 and 110 are in the neutral position. However, once the coil 230 is energized and the motor starting switch contacts 228 are closed, the auxiliary contact 232 is also closed, and thereafter, opening or closing of the limit switch 234 will not affect the operation of the motor 62.

Under these conditions of motor restarting after power failure, power control can be restored only when the rudder position and the position of the shaft 96 are such that the differential control cam assembly is in a zero position, and therefore, power is not restored except at such time as the control of pump 58 is in a neutral position. These conditions of restarting invariably result in a restoration of power at such time when the rudder position and the steering wheel indicator pointer position are incidental. The desirability of this restarting feature will be readily appreciated when it is considered what disasterous results would occur if, upon restoration of the ship's power, the rudder should suddenly be thrown hard over one way or the other.

It should also be noted upon restoration of the ship's power that the supercharger pump will create a pressure in the pipe lines 146, 148 and 164 before any main pressure can be generated by the pump 58. Thus, as the pump 58 comes up to speed, the cam followers 138 and 140 are immediately thrust against the cam 108 and it is assured that the pump stroke control is in a neutral position before any output pressure can be created in the pump. It is similarly noted that the valve 66 is immediately thrown over to pressure operating position before there is any output from the pump 58.

This invention provides a simple and practical electro-hydraulic ship's steering gear which may be, to a large extent, prefabricated, and which may be mounted on the ship with a minimum difficulty such as usually arises from the necessity of accurately mounting and aligning complex apparatus. There is a reasonable tolerance available between mounting of the ram and the ram cylinder assembly and the ship's rudder stock. The control box assembly may be placed in any convenient location on a ship and connected to the ram group cylinders by suitable hydraulic lines. The steering wheel and column assembly may be conveniently mounted on a ship and connected to the control box by means of shafting which carries only relatively light loads and which rotates at relatively low speeds.

The apparatus further provides, as has been previously described, instantaneous automatic change over from power operated steering to manually powered steering upon loss of ship's power. The apparatus further requires that there be proper alignment between the positions of the steering wheel and the power input control units before the main electric motor can be re-energized after a power failure and when such alignment occurs, the motor is automatically started. This automatic control eliminates the need for manual conversion efforts on the part of the helmsman, such as shifting of clutch levers or manipulating pins or valves and the like.

It will be apparent that various modifications may be made in the embodiment of the invention as disclosed herein without departing from the scope of the invention as set forth in the following claims.

What is claimed is:

1. In an electro-hydraulic steering device a fluid motor, a reversible discharge pump operably associated with said fluid motor, adjusting means associated with said pump for controlling the discharge of the pump, and means responsive to both manual control and operation of said fluid motor for actuating said adjusting means, said actuating means including a differential gear assembly, a cam actuated by said gear assembly, a pair of cam followers, and means holding said cam followers against said cam in substantially balanced opposition by substantially equal and constant forces, one of said followers being operably connected to said adjusting means.

2. In an electro-hydraulic steering device a fluid motor, a reversible discharge pump operably associated with said fluid motor, adjusting means associated with said pump for controlling the discharge of the pump, a manually operated steering control, and means responsive to both said manual control and operation of said fluid motor for actuating said adjusting means, said actuating means including a differential gear assembly, a cam actuated by said gear assembly, a pair of cam followers, and means holding said cam followers against said cam in substantially balanced opposition by substantially equal and constant forces, one of said followers being operably connected to said adjusting means.

3. In an electro-hydraulic steering device a fluid motor, a reversible discharge pump operatively associated with said fluid motor, a driving motor for said pump, adjusting means associated with said pump for controlling the discharge of the pump and providing at a neutral position a zero pump output, means responsive to both manual control and operation of said fluid motor for actuating said adjusting means, and means responsive to the position of said actuating means for starting the pump driving motor only when the pump adjusting means is in the neutral position.

4. In an electro-hydraulic steering device a fluid motor, a fluid control valve, a power driven pump having a reversible discharge and a constant pressure discharge, a manually driven pump, the reversible discharge of said power driven pump and the discharge of said manually driven pump being selectively operably connected to said fluid motor through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge.

5. In an electro-hydraulic steering device a fluid motor, a fluid control valve, a power driven pump having a reversible discharge and a constant pressure discharge, a manually driven fixed displacement pump, the reversible discharge of said power driven pump and the discharge of said manually driven pump being selectively operably connected to said fluid motor through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge, said manually driven pump being short-circuited upon itself through said valve when said valve is actuated by said constant pressure discharge.

6. In an electro-hydraulic steering device a fluid motor, a power driven pump having a reversible discharge for operative association with said fluid motor and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, a pump manually driven by operation of said steering control, the reversible discharge of said power driven pump and the discharge of said manually driven pump being selectively operably connected to said fluid motor through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge.

7. In an electro-hydraulic steering device a fluid motor, a power driven pump having a reversible discharge for operative association with said fluid motor and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, a fixed displacement pump manually driven by operation of said steering control, the reversible discharge of said power driven pump and the discharge of said manually driven pump being selectively operably connected to said fluid motor through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge, said manually driven pump being short-circuited upon itself through said valve when said valve is actuated by said constant pressure discharge.

8. In an electro-hydraulic steering device a fluid motor, a power driven pump having a reversible discharge for operative association with said fluid motor, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, clutch means limiting the degree of motion of the input to said actuating means by said steering control, and means responsive to the position of said actuating means for starting the pump driving motor only when the pump adjusting means is in the neutral position.

9. In an electro-hydraulic steering device a fluid motor, a power driven pump having a reversible discharge for operative association with said fluid motor and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, clutch means limiting the degree of motion of the input to said actuating means by said steering control, a pump manually driven by operation of said steering control, the reversible discharge of said power driven pump and the discharge of said manually driven pump being selectively operably connected to said fluid motor through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge.

10. In an electro-hydraulic steering device a fluid motor, a power driven pump having a reversible discharge for operative association with said fluid motor, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, clutch means limiting the degree of motion of the input to said actuating means by said steering control, means actuated by said manually operated steering control for indicating the degree of motion of the input to said actuating means, and means responsive to the position of said actuating means for starting the pump driving motor only when the pump adjusting means is in the neutral position.

11. In an electro-hydraulic steering device a pair of opposed hydraulic rams, said rams being adapted for driving connection to a ship's rudder, a power driven pump having a reversible discharge for operative association with said rams and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said rams for actuating said adjusting means, said actuating means including a differential gear assembly, a cam actuated by said gear assembly and a cam follower actuated by said cam and actuating said adjusting means, clutch means limiting the degree of motion of the input to said actuating means by said steering control, a pump in constant connection with and manually driven by operation of said steering control, the reversible discharge of said power driven pump and the discharge of said manually driven pump being selectively operably connected to said rams through said control valve, means actuated by the constant pressure discharge of said power driven pump to position said valve to operably connect the variable discharge output of the power driven pump to said fluid motor, and means positioning said valve to operably connect the manually driven pump to said fluid motor upon failure of said power driven pump constant pressure discharge.

12. In an electro-hydraulic steering device a pair of opposed hydraulic rams, said rams being adapted for driving connection to a ship's rudder, a power driven pump having a reversible discharge for operative association with said rams and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said rams for actuating said adjusting means, said actuating means including a differential gear assembly, a cam actuated by said gear assembly and a cam follower actuated by said cam and actuating said adjusting means, clutch means limiting the degree of motion of the input to said actuating means by said steering control, a pump in constant connection with and manually driven by operation of said steering control, the reversible discharge of said power driven pump and the discharge of said manually driven pump being selectively operably connected to said rams through said control valve, means actuated by the constant pressure discharge of said power driven pump to position said valve to operably connect the variable discharge output of the power driven pump to said fluid motor, means positioning said valve to operably connect the manually driven pump to said fluid motor upon failure of said power driven pump constant pressure discharge, and means responsive to the position of said differential gear assembly for restarting the pump driving motor only when the pump adjusting means is in a neutral position.

13. In an electro-hydraulic steering device a pair of opposed hydraulic rams, said rams being adapted for driving connection to a ship's rudder, a power driven pump having a reversible discharge for operative association with said rams and also having a constant pressure discharge, a manually operated steering control, adjusting means associated with said pump for controlling the reversible discharge of the pump and providing at a neutral position a zero output of the reversible discharge, actuating means responsive to both operation of said manually operated steering control and operation of said rams for actuating said adjusting means, said actuating means including a differential gear assembly, a cam actuated by said gear assembly and a cam follower actuated by said cam and actuating said adjusting means, clutch means limiting the degree of motion of the input to said actuating means by said steering control, a pump in constant connection with and manually driven by operation of said steering control, the reversible discharge of said power driven pump and the discharge of said manually driven pump being selectively operably connected to said rams through said control valve, means actuated by the constant pressure discharge of said power driven pump to position said valve to operably connect the variable discharge output of the power driven pump to said fluid motor, means positioning said valve to operably connect the manually driven pump to said fluid motor upon failure of said power driven pump constant pressure discharge, and means responsive to the position of said differential gear assembly for restarting the pump driving motor only when the ram actuated rudder is in a position corresponding to the degree of input motion to said actuating means through said clutch means and the pump adjusting means is in a neutral position.

14. In an electro-hydraulic steering device a fluid motor, a reversible discharge pump operably associated with said fluid motor, adjusting means associated with said pump for controlling the discharge of the pump, and means responsive to both manual control and operation of said fluid motor for actuating said adjusting means, said actuating means including a differential gear assembly, a cam actuated by said gear assembly, a cam follower, and means continuously urging said cam follower against said cam, said cam follower being operatively connected to said adjusting means and being the only means for operating said adjusting means.

15. In an electro-hydraulic steering device a fluid motor, a power driven pump having a reversible discharge for operative association with said fluid motor, a manually operated steering control, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, and means including a clutch for limiting the maximum degree of motion of the input to said actuating means by said steering control without similarly limiting the degree of motion of said steering control.

16. In an electro-hydraulic steering device a fluid motor, a power driven pump having a reversible discharge for operative association with said fluid motor, a manually operated steering control movable in either direction from a neutral position, adjusting means associated with said pump for controlling the reversible discharge of the pump and providing at a neutral position a zero output of the reversible discharge, actuating means responsive to both operation of said manually operated steering control and operation of said fluid motor for actuating said adjusting means, means including a clutch for limiting the maximum degree of motion in either direction from a neutral position of the input to said actuating means by said steering control without similarly limiting the degree of motion of said steering control, and means actuated by said manually operated steering control indicating the degree of motion of the input to said actuating means.

HARRY W. LINK.

REFERENCES CITED

The following references are of record in the file of this patent:

UNITED STATES PATENTS

| Number | Name | Date |
|---|---|---|
| 2,023,168 | Erling | Dec. 3, 1935 |
| 2,213,968 | Rose | Sept. 10, 1940 |
| 2,349,295 | Napier | May 23, 1944 |
| 2,403,935 | Link | July 16, 1946 |